US009002947B2

(12) United States Patent
Arizumi et al.

(10) Patent No.: US 9,002,947 B2
(45) Date of Patent: Apr. 7, 2015

(54) DISPLAY DEVICE, TERMINAL DEVICE, DISPLAY SYSTEM, DISPLAY METHOD, AND IMAGE ALTERATION METHOD (75) Inventors: Takeaki Arizumi, Sapporo (JP); Mitsuhiro Yoshida, Sapporo (JP); Issei Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 13/047,322

(22) Filed: Mar. 14, 2011

(65) Prior Publication Data
US 2011/0221763 A1 Sep. 15, 2011

(30) Foreign Application Priority Data

Mar. 15, 2010 (JP) ................. 2010-057357

(51) Int. Cl.
G06F 15/16 (2006.01)
G06F 3/14 (2006.01)
H04N 9/31 (2006.01)

(52) U.S. Cl.
CPC ............ *G06F 3/1454* (2013.01); *H04N 9/3179* (2013.01)

(58) Field of Classification Search
CPC ............ H04N 9/3197; H04N 21/4122; H04N 21/4143; H04N 21/43637; H04N 21/440218; H04N 1/00103; H04N 1/00281; H04N 1/00291; H04N 1/00315; H04N 1/4177; H04N 21/43615; H04N 21/485; H04N 9/3147
USPC .............. 709/205; 345/1.1–3.4; 715/733–759
See application file for complete search history.

(56) References Cited

U.S. PATENT DOCUMENTS

| 7,079,129 | B2 | 7/2006 | Shigeta |
| 7,180,511 | B2 | 2/2007 | Shigeta |
| 7,260,786 | B2 | 8/2007 | Sekiguchi et al. |
| 8,310,582 | B2 * | 11/2012 | Yoon ........................ 348/333.05 |
| 2004/0130568 | A1 * | 7/2004 | Nagano et al. ................. 345/733 |
| 2007/0050729 | A1 * | 3/2007 | Kawamura et al. ........... 715/781 |
| 2008/0098295 | A1 * | 4/2008 | Nelson et al. ................. 715/233 |
| 2009/0043846 | A1 * | 2/2009 | Inoue ............................ 709/204 |
| 2009/0043899 | A1 | 2/2009 | Kubota |
| 2009/0044116 | A1 | 2/2009 | Kitabayashi |
| 2009/0265660 | A1 * | 10/2009 | Nobori .......................... 715/788 |

FOREIGN PATENT DOCUMENTS

| JP | A-2004-54783 | 2/2004 |
| JP | A-2009-42912 | 2/2009 |
| JP | A-2009-42914 | 2/2009 |
| JP | A-2009-44328 | 2/2009 |

* cited by examiner

*Primary Examiner* — Douglas W Owens
*Assistant Examiner* — Monica C King
(74) *Attorney, Agent, or Firm* — Oliff PLC (57) ABSTRACT A display device includes: a display-side communication section adapted to receive image configuration alteration request information related to a configuration of a first image and image information of at least one second image constituting the first image from at least one terminal device; a display-side image generation section adapted to generate the first image based on the image configuration alteration request information and the image information; and a display-side display section adapted to display the first image.

10 Claims, 10 Drawing Sheets

| TIME POINT | CPA | | | CPB | | | CPC | | | CPD | | | EBPJ | | |
|---|---|---|---|---|---|---|---|---|---|---|---|---|---|---|---|
| | RECEPTION NUMBER | TENTATIVE IMAGE CONFIGURATION | IMAGE CONFIGURATION | RECEPTION NUMBER | TENTATIVE IMAGE CONFIGURATION | IMAGE CONFIGURATION | RECEPTION NUMBER | TENTATIVE IMAGE CONFIGURATION | IMAGE CONFIGURATION | RECEPTION NUMBER | TENTATIVE IMAGE CONFIGURATION | IMAGE CONFIGURATION | RECEPTION NUMBER | TENTATIVE IMAGE CONFIGURATION | IMAGE CONFIGURATION |
| t0 | 1 | 1 | 1 | 1 | 1 | 1 | 1 | 1 | 1 | 1 | 1 | 1 | 1 | 1 | 1 |
| t1 | 2 | 4 | 4 | 2 | 4 | 1 | 2 | 4 | 1 | 2 | 4 | 1 | 2 | 4 | 1 |
| t2 | 3 | 2 | 4 | 3 | 2 | 2 | 3 | 2 | 1 | 3 | 2 | 1 | 3 | 2 | 1 |
| t3 | 3 | 2 | 4 | 3 | 2 | 2 | 3 | 2 | 1 | 3 | 2 | 1 | 3 | 2 | 1 |
| t4 | 3 | 2 | 4 | 3 | 2 | 2 | 3 | 2 | 1 | 3 | 2 | 1 | 3 | 2 | 1 |
| t5 | 3 | 2 | 2 | 3 | 2 | 2 | 3 | 2 | 2 | 3 | 2 | 2 | 3 | 2 | 2 |

DISPLAY DEVICE, TERMINAL DEVICE, DISPLAY SYSTEM, DISPLAY METHOD, AND IMAGE ALTERATION METHOD

The entire disclosure of Japanese Patent Application No. 2010-057357, filed Mar. 15, 2010 is expressly incorporated by reference herein.

BACKGROUND

1. Technical Field

The present relates to a display device, a terminal device, a display system, a display method, and an image alteration method.

2. Related Art

For example, in JP-A-2004-54783, there is described a display system for receiving the captured image data, on which the size conversion process is performed, from a plurality of terminal devices, and combining the image data into image data of one frame and then displaying the frame. Further, in this document, there is also described the fact that the image in a specific terminal device is displayed in an enlarged manner, deleted, or added by operating a remote controller of the display device to thereby set the priority.

However, in conferences, for example, in the case in which the presenter enlarges the image of a participant using a remote controller in response to the request from the participant, the presenter needs to identify the image of the participant, understand the contents of the request, and operate the remote controller in accordance with the request, and therefore, the operation takes time. Further, in the document described above, although there is a description reading that the split screen or the like to be displayed in an enlarged manner can be designated from the terminal devices, there is no description of the specific method thereof.

SUMMARY

An advantage of some aspects of the invention is to solve the problem described above thereby providing a display device, a terminal device, a display system, a program, an information storage medium, a display method, and an image alteration method each capable of altering a first image in response to an instruction from the terminal device in the case in which the display device displays the first image including second images of the respective terminal devices.

According to an aspect of the invention, there is provided a display device including a display-side communication section adapted to receive, from at least one terminal device, image configuration alteration request information related to a configuration of a first image and image information of at least one second image constituting the first image, a display-side image generation section adapted to generate the first image based on the image configuration alteration request information and the image information, and a display-side display section adapted to display the first image.

Further, according to another aspect of the invention, there is provided a terminal device including a terminal-side image generation section adapted to generate configuration altering image used to alter a configuration of a first image displayed by at least one display device, a terminal-side display section adapted to display the configuration altering image, a terminal-side information generation section adapted to generate image configuration alteration request information related to a configuration of the first image in response to configuration alteration request operation in a condition in which the configuration altering image is displayed, and a terminal-side communication section adapted to transmit the image configuration alteration request information toward the display device.

Further, according to still another aspect of the invention, there is provided a display system including the display device according to the above aspect of the invention, and the terminal device according to the above aspect of the invention.

Further, according to yet another aspect of the invention, there is provided a display method of an image including the steps of: providing a display device including a display-side display section and a display-side communication section, receiving image configuration alteration request information related to a configuration of a first image and image information of at least one second image constituting the first image from at least one terminal device, generating the first image based on the image configuration alteration request information and the image information, and displaying the first image by the display-side display section.

Further, according to still yet another aspect of the invention, there is provided an image alteration method including the steps of: providing a terminal device including a terminal-side display section and a terminal-side communication section, generating configuration altering image used to alter a configuration of a first image displayed by at least one display device, displaying the configuration altering image by the terminal-side display section, generating image configuration alteration request information related to a configuration of the first image in response to configuration alteration request operation in a condition in which the configuration altering image is displayed, and transmitting the image configuration alteration request information by the terminal-side communication section toward the display device.

According to the aspects of the invention, since the display device or the like receives the image configuration alteration request information related to the configuration of the first image from the terminal device, and generates the first image in accordance with the image configuration alteration request information, when the display device displays the first image including the second images of the respective terminal devices, the first image can be altered in accordance with the instruction from the terminal device.

Further, according to the aspects the invention, since the terminal device or the like transmits the image configuration alteration request information related to the configuration of the first image, when the display device displays the first image including the second images of the respective terminal devices, the first image can be altered in accordance with the instruction from the terminal device.

Further, according to the present embodiment, by transmitting and receiving the transmission start request information, the display device or the like can generate the first image using the image information even in the case in which the transmission of the image information newly becomes necessary.

Further, according to the aspects of the invention, by transmitting and receiving the transmission start request information, even in the case in which the transmission of the image information becomes unnecessary, the display device or the like can generate the first image without using the image information.

Further, according to the aspects of the invention, by transmitting and receiving the priority information and so on, the display device or the like can prevent the image configuration alteration even in the case in which the image configuration alteration requests occur nearly simultaneously, and therefore, generation of flicker or the like on the image can be reduced.

Further, according to the aspects of the invention, since the display device or the like transmits the image configuration information related to the configuration of the first image to the terminal device, the terminal device can obtain the configuration of the first image.

Further, according to the aspects of the invention, since the terminal device alters the configuration altering images in accordance with the configuration alteration request operation, the user can understand the present image configuration.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Hereinafter, some embodiments of the invention applied to a projector will be described with reference to the accompanying drawings.

It should be noted that the embodiments described below do not at all limit contents of the invention as set forth in the appended claims. Further, each of the constituents shown in the embodiments below is not necessarily indispensable as the means for solving the problem in the invention set forth in the appended claims.

First Embodiment

Figure 1:
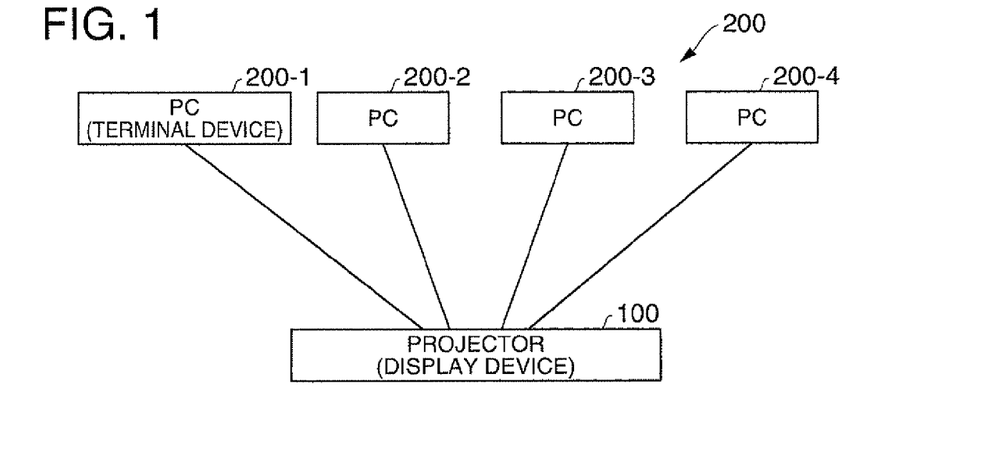
FIG. 1 is a diagram showing an example of a display system according to a first embodiment of the invention.

FIG. 1 is a diagram showing an example of a display system according to a first embodiment of the invention. The display system is configured including a projector 100 as a type of display device, and four PCs 200-1 through 200-4 as a type of terminal devices. Each of the PCs 200 is configured to be able to perform communication with the projector 100 in a wireless manner (or wired manner as well). Here, it is assumed that four users view the presentation image projected by the projector 100 while performing operations using the respective PCs 200.

The projector 100 has functions of receiving image configuration alteration request information from the PCs 200, altering individual images (second images) constituting the presentation image (a first image) in accordance with the image configuration alteration request information, and projecting the presentation image thus altered. Further, the PCs 200 each have a function of determining whether or not the image configuration is altered based on a reception number (priority) provided by the projector 100.

Then, functional blocks of the projector 100 having such functions will be explained.

Figure 2:
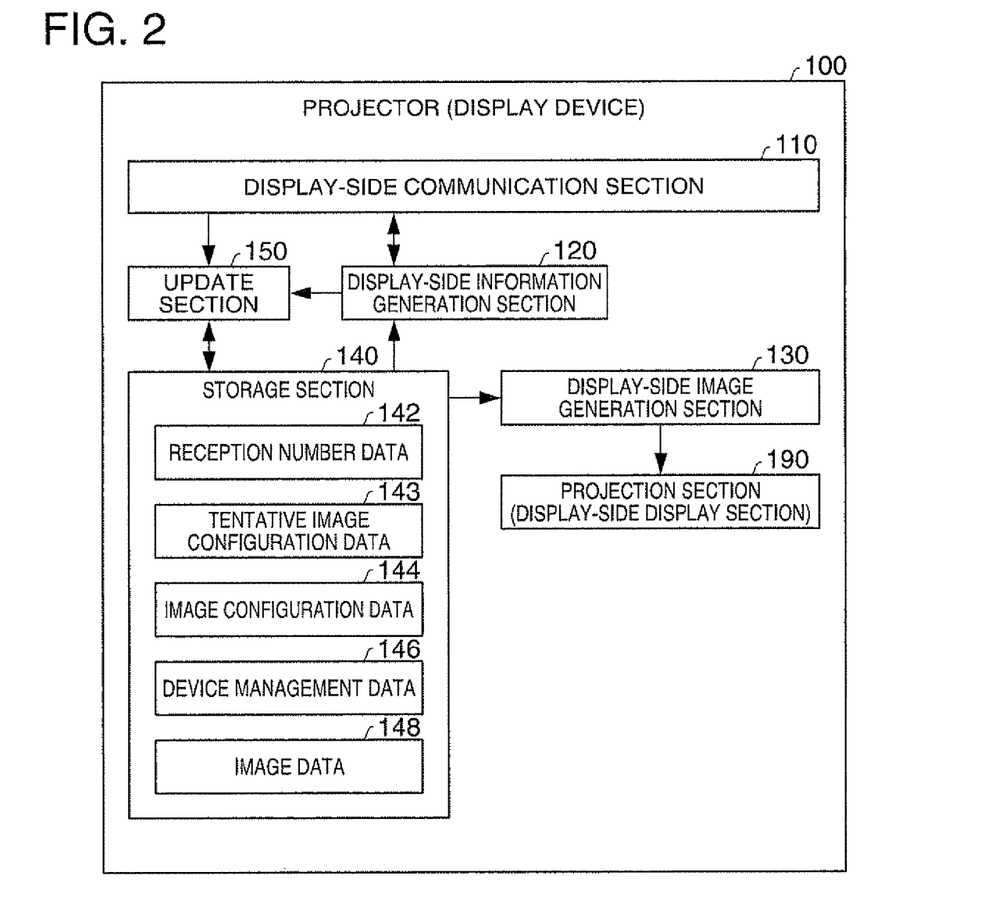
FIG. 2 is a functional block diagram of a projector in the first embodiment.

FIG. 2 is a functional block diagram of the projector 100 according to the first embodiment. The projector 100 is configured including a display-side communication section 110 for performing communication with the PC 200s, a display-side information generation section 120 for generating various types of information, a display-side image generation section 130 for generating various images, a storage section 140 for storing various data, an update section 150 for updating the data in the storage section 140, and a projection section 190 as a type of display-side display section.

Further, the storage section 140 stores, for example, reception number data 142 representing the reception number, tentative image configuration data 143 representing image configuration to be altered, image configuration data 144 representing the image configuration defined, device management data 146 representing the communication object device, and image data 148 representing, for example, image information received from the PCs 200.

It should be noted that the projector 100 can also function as these sections using the following hardware. For example, in the projector 100, a wireless communication unit or the like can be used as the display-side communication section 110, a CPU or the like can be used as the display-side information generation section 120 and the update section 150, an image processing circuit or the like can be used as the display-side image generation section 130, a RAM or the like can be used as the storage section 140, a lamp, a liquid crystal panel, a liquid crystal drive circuit, a lens, and so on can be used as the projection section 190.

Figure 3:
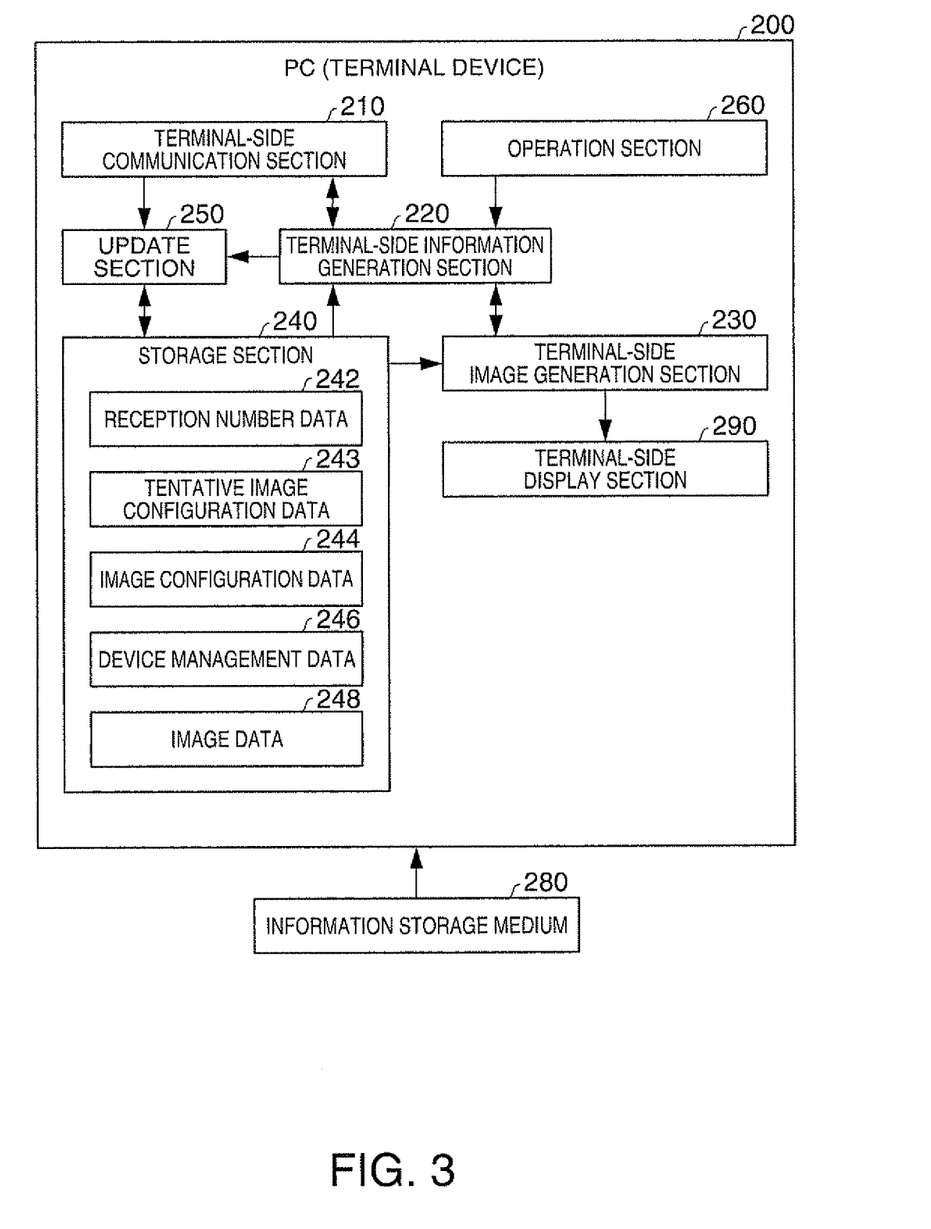
FIG. 3 is a functional block diagram of a PC in the first embodiment.

Then, functional blocks of each of the PCs 200 having the functions described above will be explained. FIG. 3 is a functional block diagram of the PC 200 in the first embodiment. The PC 200 is configured including a terminal-side communication section 210 for performing communication with the projector 100, a terminal-side information generation section 220 for generating various types of information, a terminal-side image generation section 230 for generating various images, a storage section 240 for storing various data, an update section 250 for updating the data in the storage section 240, an operation section 260 for accepting operations of the user, and a terminal-side display section 290.

Further, the storage section 240 stores, for example, reception number data 242 representing the reception number, tentative image configuration data 243 representing image configuration to be altered, image configuration data 244 representing the image configuration defined, device management data 246 representing the communication object device, and image data 248 representing, for example, image information.

It should be noted that the PC 200 can also function as these sections using the following hardware.

For example, in the PC 200, a wireless communication unit or the like can be used as the terminal-side communication section 210, a CPU or the like can be used as the terminal-side information generation section 220 and the update section 250, an image processing circuit or the like can be used as the terminal-side image generation section 230, a RAM or the like can be used as the storage section 240, a keyboard, a mouse, and so on can be used as the operation section 260, and a liquid crystal display or the like can be used as the terminal-side display section 290.

Further, it is also possible for the computer provided to the PC 200 to retrieve a program stored in an information storage medium 280 to thereby function as the terminal-side image generation section 230 or the like. As such an information storage medium 280, CD-ROM, DVD-ROM, ROM, RAM, HDD, and so on can be applied.

Figure 4:
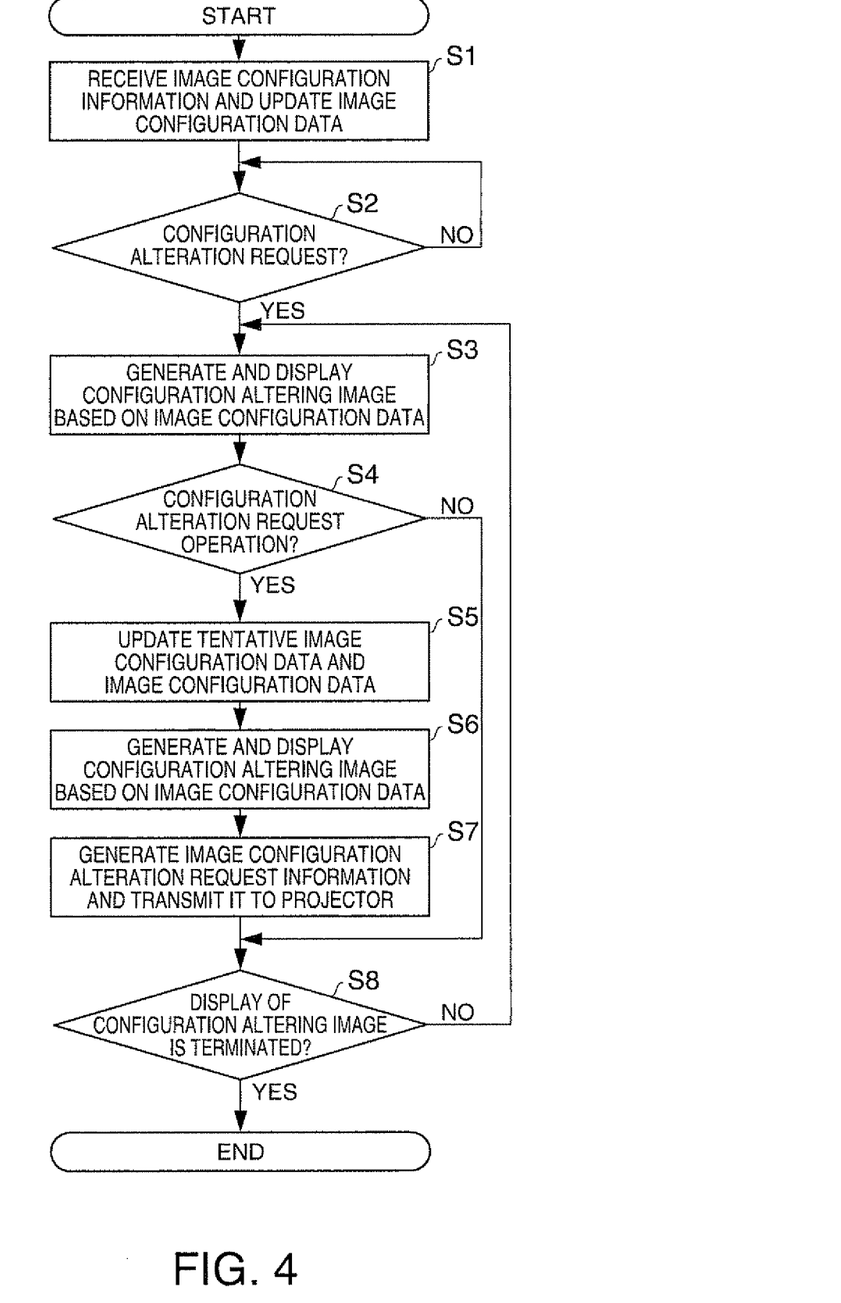
FIG. 4 is a flowchart showing the procedure of a process for altering a configuration by the PC in the first embodiment.
Figure 5:
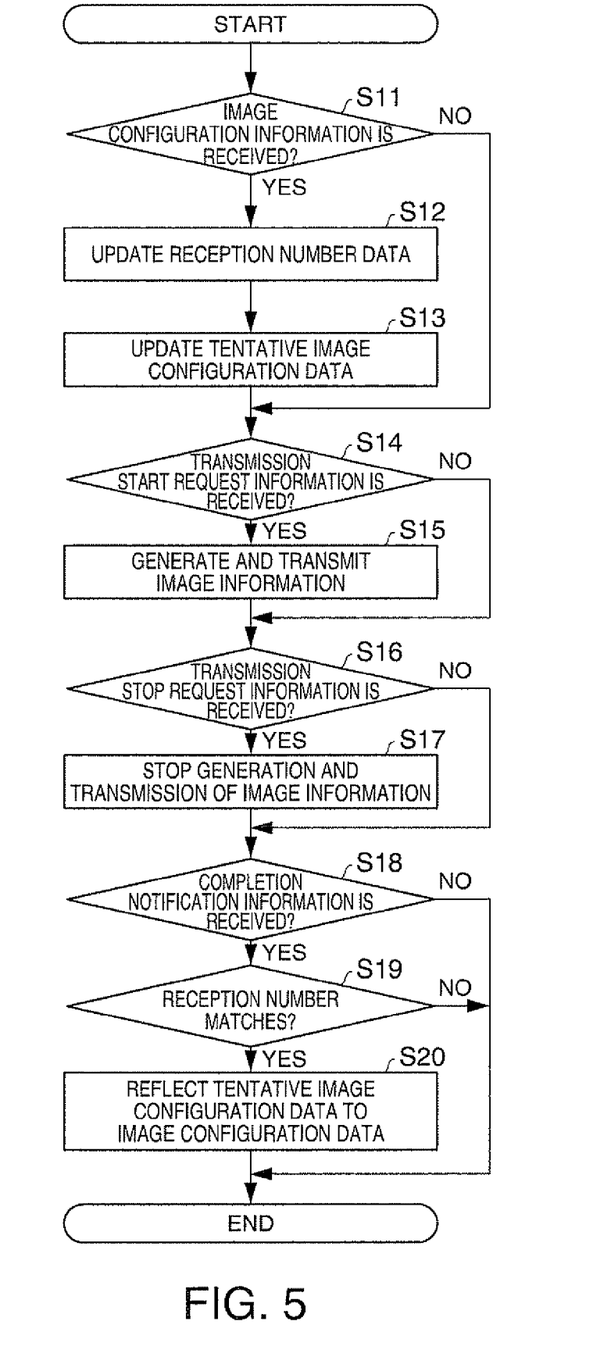
FIG. 5 is a flowchart showing the procedure of a process for altering an image configuration in accordance with a reception number by the PC in the first embodiment.
Figure 6:
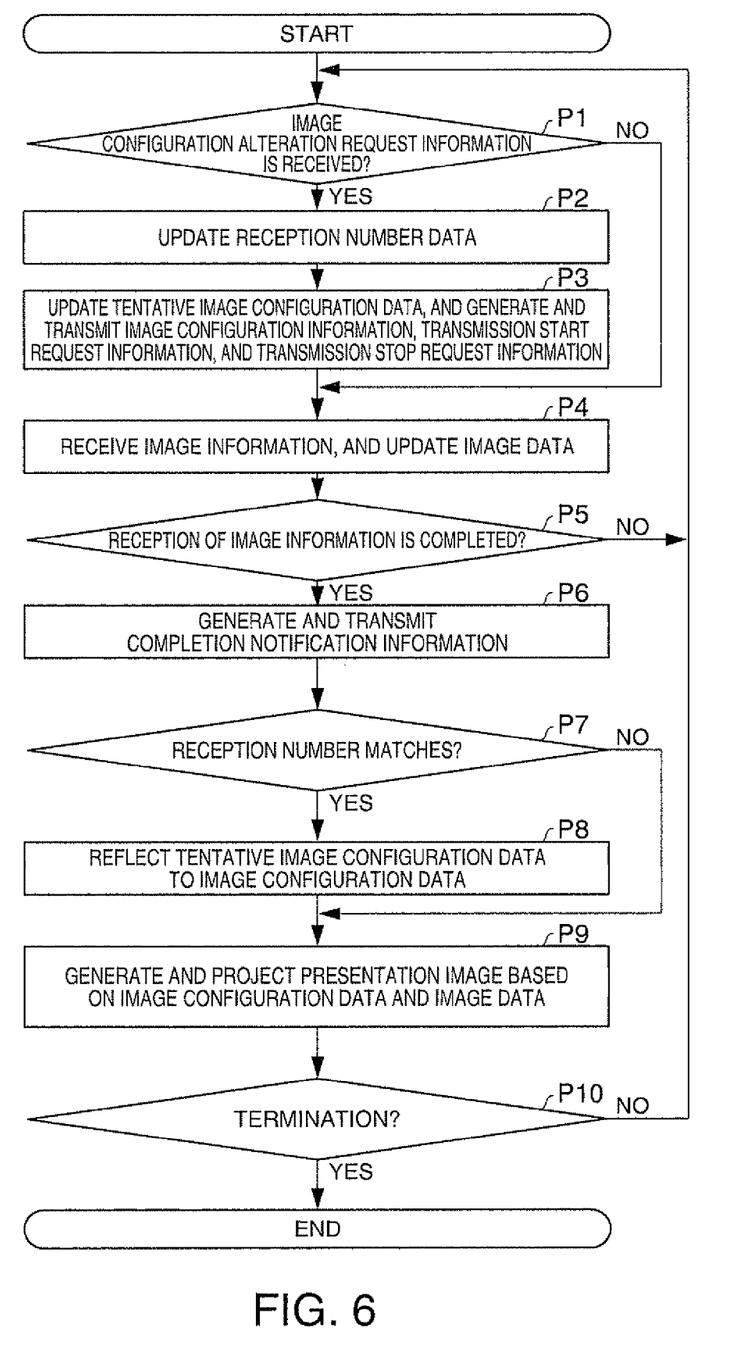
FIG. 6 is a flowchart showing a display procedure by the projector in the first embodiment.
Figure 7:
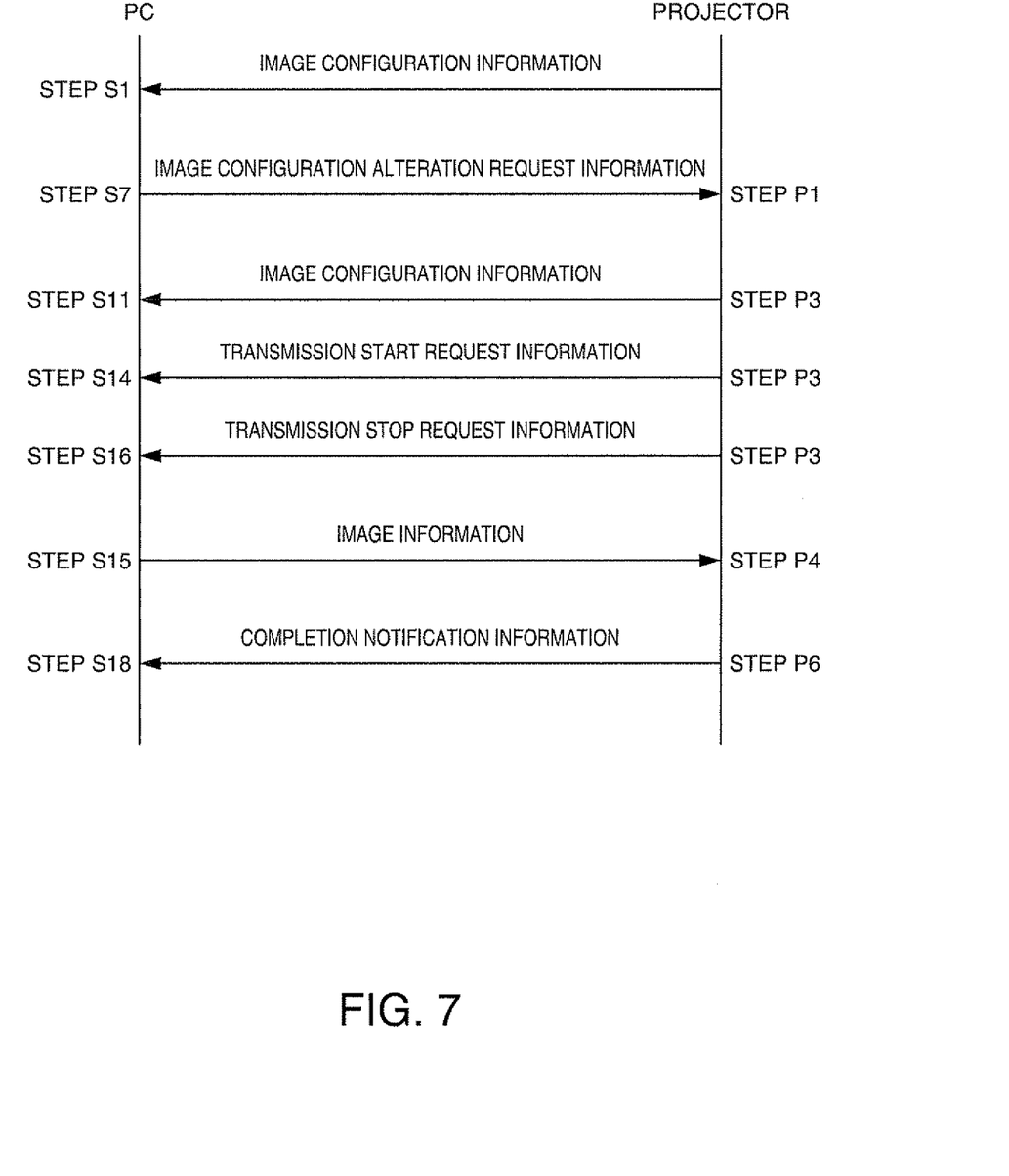
FIG. 7 is a sequence chart showing an exchange of information between the PC and the projector in the first embodiment.

Then, a procedure of projecting the presentation image in accordance with an image configuration alteration request using the projector 100 and the PC 200 will be explained. FIG. 4 is a flowchart showing the procedure of a process for altering the configuration by the PC 200 in the first embodiment. Further, FIG. 5 is a flowchart showing the procedure of a process for altering an image configuration in accordance with the reception number by the PC 200 in the first embodiment. Further, FIG. 6 is a flowchart showing a display procedure by the projector 100 in the first embodiment. Further, FIG. 7 is a sequence chart showing an exchange of information between the PC 200 and the projector 100 in the first embodiment.

The terminal-side communication section 210 of the PC 200 receives the image configuration information from the projector 100 in the condition in which it becomes possible for the terminal-side communication section 210 to have communication with the projector 100 due to establishment of the connection therebetween, and then the update section 250 updates (step S1) the image configuration data 244 so that the image configuration designated by the image configuration information is achieved. It should be noted that it is also possible that the update section 250 of the PC 200 updates the device management data 246 so as to update the device, which can communicate therewith, in response to establishment of the connection, and the update section 150 of the projector 100 updates the device management data 146 so as to update the device, which can communicate therewith, in response to establishment of the connection.

The user performs the image configuration alteration request using the operation section 260. The terminal-side information generation section 220 determines (step S2) whether or not the image configuration alteration request has occurred based on the information from the operation section 260, and then outputs the control information to the terminal-side image generation section 230 if the image configuration alteration request has occurred.

The terminal-side image generation section 230 generates a configuration altering image for altering the configuration of the presentation image based on the image configuration data 244 in accordance with the control information, and the terminal-side display section 290 displays (step S3) the configuration altering image superimposed on the present image. Specifically, the configuration altering image can be an on-screen display (OSD) image.

Figure 8:
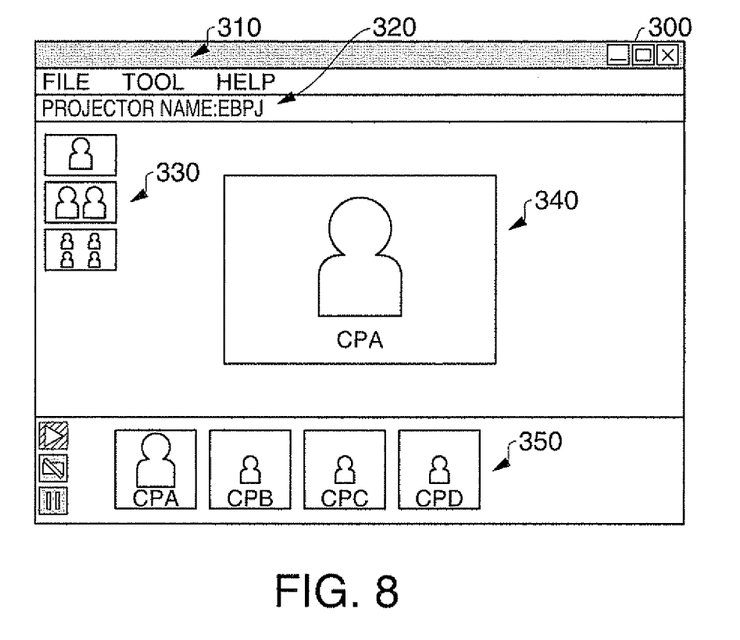
FIG. 8 is a diagram showing an example of a configuration altering image in the first embodiment.
Figure 9:
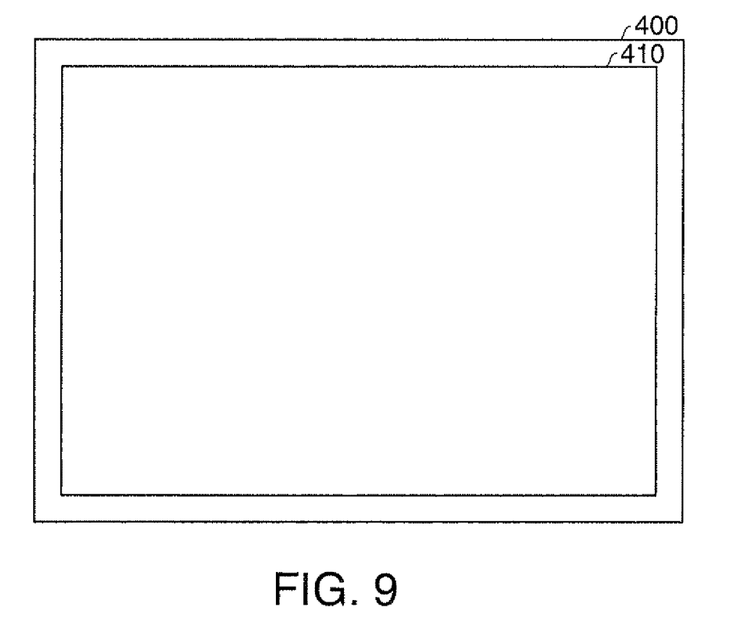
FIG. 9 is a diagram showing an example of a presentation image in the first embodiment.

FIG. 8 is a diagram showing an example of the configuration altering image 300 in the first embodiment. Further, FIG. 9 is a diagram showing an example of the presentation image 400 in the first embodiment. For example, the configuration altering image 300 includes, for example, a menu image 310 including "FILE," "TOOL," "HELP," and so on, an image 320 representing an identification name of the projector 100 presently connected thereto, selection button images 330 used for selecting the image configuration, an image 340 showing the present image configuration, and icon images 350 respectively showing identification names of the PCs 200 presently connected thereto.

In the example shown in FIG. 8, the image configuration displaying the individual image of the PC 200-1 alone is selected. The presentation image 400 on this occasion is the image shown in FIG. 9. The presentation image 400 includes the individual image 410 based on the image information from the PC 200-1.

It should be noted that the selection button images 330 for selecting the image configuration here have three types, namely a button image for displaying one individual image alone, a button image for displaying two individual images right and left, and a button image for displaying four individual images in a 2×2 matrix. It is obvious that the configuration of the individual images is not limited to these configurations.

In the condition in which the configuration altering image 300 is displayed, the user clicks either one of the selection button images 330 or dragging and dropping either one of the icon images 350 into the image 340 located at the center and showing the present image configuration, thereby performing the configuration alteration request operation.

The terminal-side information generation section 220 determines (step S4) whether or not the configuration alteration request operation (generation of the configuration alteration request event) has been made based on the operation information from the operation section 260. If the configuration alteration request operation has been made, the terminal-side information generation section 220 outputs the control information to the update section 250.

The update section 250 updates (step S5) the tentative image configuration data 243 and the image configuration data 244 in accordance with the control information. The terminal-side image generation section 230 generates the configuration altering image based on the image configuration data 244 thus updated, and the terminal-side display section 290 displays (step S6) the configuration altering image.

Further, if the configuration alteration request operation has been made, the terminal-side information generation section 220 generates the image configuration alteration request information (e.g., the arrangement of the individual images, the information representing the identification information of the PCs 200 configuring the respective individual images) in accordance with the configuration alteration request operation, and then transmits (step S7) the image configuration alteration request information toward the projector 100. For example, the image configuration alteration request information is the information representing, for example, the type of the selection button image thus selected, the identification information of the PCs 200 allocated to the display object, identification information of the PC 200 as the transmission source.

The terminal-side information generation section 220 determines (step S8) whether or not a display termination instruction of the configuration altering image 300 has been made based on the operation information from the operation section 260, and then controls the terminal-side image generation section 230 to stop the generation of the configuration altering image 300 if the display termination instruction has been made.

Figure 10:
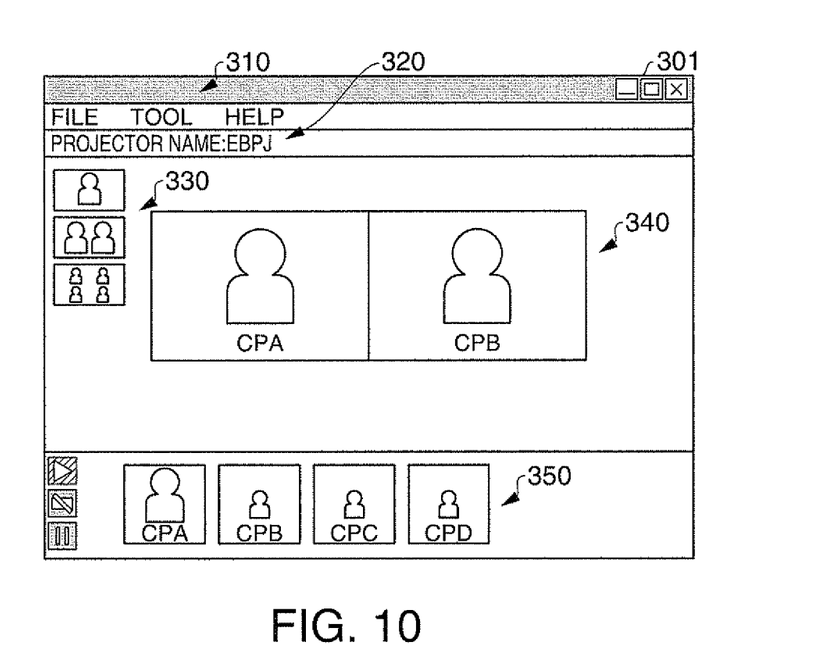
FIG. 10 is a diagram showing another example of the configuration altering image in the first embodiment.

FIG. 10 is a diagram showing another example (the configuration altering image 301) of the configuration altering image 300 in the first embodiment. For example, if the user selects the selection button image 330 for displaying two individual images right and left in the condition in which the configuration altering image 300 shown in FIG. 8 is displayed, the terminal-side display section 290 displays the configuration altering image 301 shown in FIG. 10.

The display-side information generation section 120 of the projector 100 determines (step P1) whether or not the image configuration alteration request information from the PC 200 has been received by the display-side communication section 110. If the image configuration alteration request information has been received, the display-side information generation section 120 outputs the control information to the update section 150, and the update section 150 updates (step P2) the reception number data 142 so as to increment the reception number by one in accordance with the control information.

Further, the update section 150 updates the tentative image configuration data 143 based on the image configuration alteration request information, and the display-side information generation section 120 generates the image configuration information including the reception number information (the priority information) representing the latest reception number based on the reception number data 142 and showing the configuration of the individual images (e.g., the arrangement of the individual images and the information representing the identification information of the PCs 200 constituting the respective individual images) based on the tentative image configuration data 143 and the image configuration data 144, and further generates the transmission start request information if the image information is newly required, or generates the transmission stop request information if the image information becomes unnecessary, and the display-side communication section 110 transmits (step P3) the information listed above toward the respective PCs 200.

For example, the display-side communication section 110 can adopt the method of transmitting the transmission start request information toward the PC 200, which newly becomes the transmission source of the image information, and transmitting the transmission stop request information toward the PC 200, which is no longer required to transmit the image information, or can adopt the method of transmitting the transmission start request information and the transmission stop request information toward all of the PCs 200 capable of communicating therewith. Here, it is assumed that the former method is adopted.

The update section 250 of the PC 200 determines (step S11) whether or not the image configuration information including the reception number information transmitted from the projector 100 has been received by the terminal-side communication section 210, and updates (step S12) the reception number data 242 based on the reception number information, and updates (step S13) the tentative image configuration data 243 based on the image configuration information if the image configuration information has been received.

Further, the terminal-side information generation section 220 determines (step S14) whether or not the transmission start request information transmitted from the projector 100 has been received by the terminal-side communication section 210, and if the transmission start request information has been received, the image information is generated based on the transmission start request information and the image data 248, and the terminal-side communication section 210 transmits (step S15) the image information toward the projector 100. It should be noted that it is also possible that the terminal-side information generation section 220 captures the image (except the configuration altering images 300, 301) presently displayed by the terminal-side image generation section 230 based on the information from the terminal-side image generation section 230, and the update section 250 updates the image data 248 so as to represent the image presently displayed based on the information thus captured.

Further, the terminal-side information generation section 220 determines (step S16) whether or not the transmission stop request information transmitted from the projector 100 has been received by the terminal-side communication section 210, and stops (step S17) the generation of the image information based on the transmission stop request information if the transmission stop request information has been received. Thus, the transmission of the image information in the PC 200 is also stopped.

The display-side communication section 110 of the projector 100 receives the image information from the PC 200, and the update section 150 updates (step P4) the image data 148 based on the image information. It should be noted that it is also possible for the update section 150 to update the device management data 146 so as to represent whether or not the image information of each of the PCs 200 constituting the individual images 410 has been received in response to the reception of the image information based on the image configuration data 144.

The display-side information generation section 120 determines (step P5) whether or not the reception of all of the image information to be necessary has been completed based on the image information, the image configuration data 144, and the device management data 146.

If the reception of all of the image information to be necessary has been completed, the display-side information generation section 120 generates the completion notification information including the information representing the latest reception number based on the reception number data 142, and the display-side communication section 110 transmits (step P6) the completion notification information toward each of the PCs 200.

The update section 250 of the PC 200 determines (step S18) whether or not the completion notification information transmitted from the projector 100 has been received by the terminal-side communication section 210, and determines (step S19) whether or not the deception number indicated by the completion notification information matches the reception number represented by the reception number data 242 if the completion notification information has been received. If they match each other, the update section 250 performs (step S20) the update of reflecting the tentative image configuration data 243 to the image configuration data 244. In contrast, if they do not match each other, the update section 250 does not update the image configuration data 244.

Similarly, the update section 150 of the projector 100 also determines (step P7) whether or not the reception number indicated by the completion notification information matches the reception number represented by the reception number data 142, and performs (step P8) the update of reflecting the tentative image configuration data 143 to the image configuration data 144 if they match each other. In contrast, if they do not match each other, the update section 150 does not update the image configuration data 144.

The display-side image generation section 130 generates the presentation image corresponding to the image configuration based on the image configuration data 144 and the image data 148, and the projection section 190 projects the presentation image (step P9).

Figure 11:
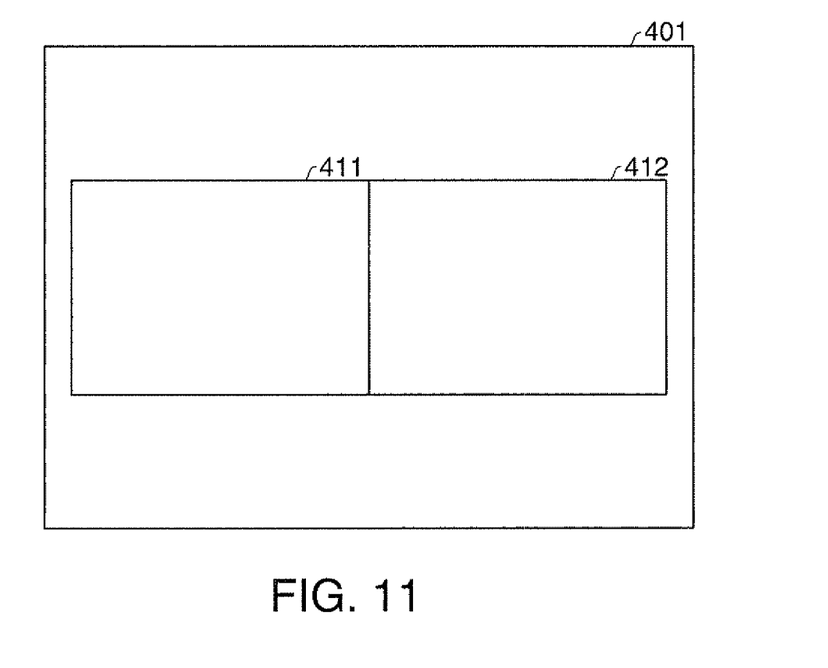
FIG. 11 is a diagram showing another example of the presentation image in the first embodiment.

FIG. 11 is a diagram showing another example (the presentation image 401) of the presentation image 400 in the first embodiment. The presentation image 401 includes two individual images 411, 412. For example, if the reception of all of the image information corresponding to the configuration altering image 301 shown in FIG. 10 is completed, the projector 100 projects the presentation image 401.

The projector 100 determines (step P10) whether or not the termination instruction has been made, and repeatedly performs the series of processes (steps P1 through P10) described above until the termination instruction is made.

Here, the specific example of the case in which the PC 200-2 performs the image configuration alteration request for constituting the presentation image with the two individual images of the PC 200-2 and the PC 200-3 immediately after the PC 200-1 has performed the image configuration alteration request for constituting the presentation image with four individual images will be explained.

Figure 12:
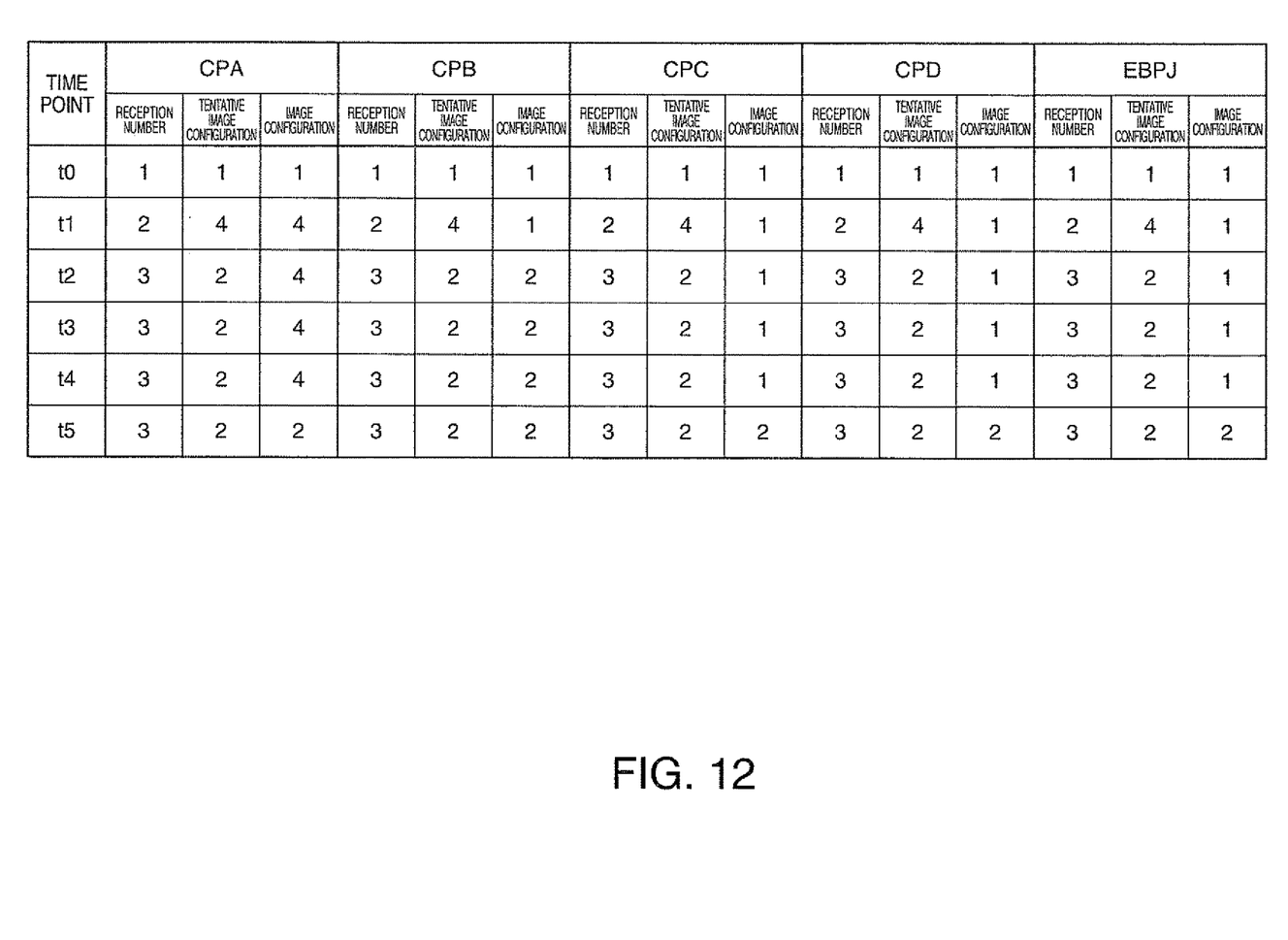
FIG. 12 is a diagram showing an example of the transition of the reception number, a tentative image configuration, and the image configuration in the first embodiment.

FIG. 12 is a diagram showing an example of the transition of the reception number, the tentative image configuration, and the image configuration in the first embodiment. It should be noted that in FIG. 12 PC 200-1 corresponds to CPA, the PC 200-2 corresponds to CPB, the PC 200-3 corresponds to CPC, the PC 200-4 corresponds to CPD, and the projector 100 corresponds to EBPJ.

At a time point t0, the reception number data 142, 242 represent the reception number 1, the tentative image configuration data 143, 243 denote that the image is composed of a single individual image, and the image configuration data 144, 244 also denote that the image is composed of a single individual image. It should be noted that in reality the tentative image configuration data 143, 243 and the image configuration data 144, 244 also include, for example, the information representing which one of the PCs 200 the individual image corresponds to.

Firstly, in response to the PC 200-1 performing the image configuration alteration request, the projector 100 transmits the image configuration information, which includes the reception number information representing the reception number 2 and denotes that the image is composed of four individual images, toward each of the PCs 200, and then transmits the transmission start request information toward the PCs 200-2 through 200-4. At this time point (the time point t1), the reception number data 242 of each of the PCs 200 represents the reception number 2, and the reception number data 142 of the projector 100 also represents the reception number 2. Further, the tentative image configuration data 143, 243 denote that the image is composed of four individual images, the image configuration data 144, 244 of the devices other than the PC 200-1 denote that the image is composed of a single individual image, and the image configuration data 144 of the PC 200-1 denotes that the image is composed of four individual images.

Before completion of the reception of the image information from the PCs 200-1 through 200-4, the projector 100 receives the image configuration alteration request information from the PC 200-2, and transmits the image configuration information, which includes the reception number information representing the reception number 3 and denotes that the image is composed of two individual images, toward each of the PCs 200, and then transmits the transmission stop request information toward the PCs 200-1, 200-4. At this time point (the time point t2), the reception number data 242 of each of the PCs 200 and the reception number data 142 of the projector 100 represent the reception number 3. Further, the tentative image configuration data 243 of the PCs 200-1 through 200-4 denote that the image is composed of two individual images, the image configuration data 244 of the PCs other than the PCs 200-1, 200-2 denote that the image is composed of a single individual image, the image configuration data 244 of the PC 200-1 denotes that the image is composed of four individual images, and the image configuration data 244 of the PC 200-2 denotes that the image is composed of two individual images. Further, the tentative image configuration data 143 of the projector 100 denotes that the image is composed of two individual images, and the image configuration data 144 denotes that the image is composed of a single individual image.

Based on the device management data 146, if reception of the image information corresponding to the reception number 2 is completed, the projector 100 transmits the completion notification information corresponding to the reception number 2 toward the PCs 200-1 through 200-4. The completion notification information indicates the reception number 2. At this time point, the reception number data 242 of each of the PCs 200 represents the reception number 3, which fails to match the reception number indicated by the completion notification information, and therefore, the tentative image configuration data 243 is not reflected to the image configuration data 244. Further, the reception number data 142 of the projector 100 also represents the reception number 3, which fails to match the reception number indicated by the completion notification information, and therefore, the tentative image configuration data 143 is not reflected to the image configuration data 144.

Therefore, at this time point (the time point t4), the projector 100 projects the individual image of the PC 200-1 alone, the configuration altering image 300 of the PC 200-1 shows four individual images, the configuration altering image 300 of the PC 200-2 shows two individual images, and the configuration altering image 300 of each of the PCs 200-3, 200-4 shows a single individual image.

Subsequently, if the projector 100 receives all of the image information corresponding to the reception number 3, the projector 100 transmits the completion notification information corresponding to the reception number 3 toward each of the PCs 200. The completion notification information indicates the reception number 3. On this occasion, the reception number data 242 of each of the PCs 200 represents the reception number 3, which matches the reception number indicated by the completion notification information, and therefore, the tentative image configuration data 243 is reflected to the image configuration data 244. Further, in the projector 100, the completion notification information is corresponding to the reception number 3 while the reception number represented by the reception number data 142 is also 3, and they match each other, and therefore, the tentative image configuration data 143 is reflected to the image configuration data 144.

Therefore, at this time point (the time point t5), the projector 100 projects the two individual images of the PCs 200-2, 200-3, and the configuration altering image 300 of each of the PCs 200-1 through 200-4 shows the two individual images of the PCs 200-2, 200-3.

As described above, according to the present embodiment, the projector 100 receives the image configuration alteration request information related to the configuration of the presentation image 401 from the PCs 200, and generates the presentation image 401 in accordance with the image configuration alteration request information. Therefore, in the case in which the projector 100 projects the presentation image 401 including the individual images 411, 412 of the respective PCs 200, the projector 100 can alter the first image in accordance with the instruction from the PCs 200. Thus, the projector 100 can enhance the convenience of the users.

Further, according to the present embodiment, by transmitting and receiving the transmission start request information, the projector 100 can generate the presentation images 400, 401 using the image information even in the case in which the transmission of the image information newly becomes necessary.

Further, according to the present embodiment, by transmitting and receiving the transmission stop request information, the projector 100 can generate the presentation images 400, 401 without using the image information even in the case in which the transmission of the image information becomes unnecessary.

Further, according to the present embodiment, by transmitting and receiving the image configuration information and so on indicating the reception number, the projector 100 can prevent the image configuration alteration even in the case in which the image configuration alteration requests occur nearly simultaneously, and therefore, generation of flicker or the like on the image can be reduced.

Further, according to the present embodiment, since the projector 100 transmits the image configuration information related to the configuration of the presentation images 400, 401 to the PCs 200, the PCs 200 can obtain the configuration of the presentation images 400, 401.

Further, according to the present embodiment, since the PCs 200 alter the configuration altering images 300, 301 in accordance with the configuration alteration request operation, the user can understand the present image configuration.

Second Embodiment

Figure 13:
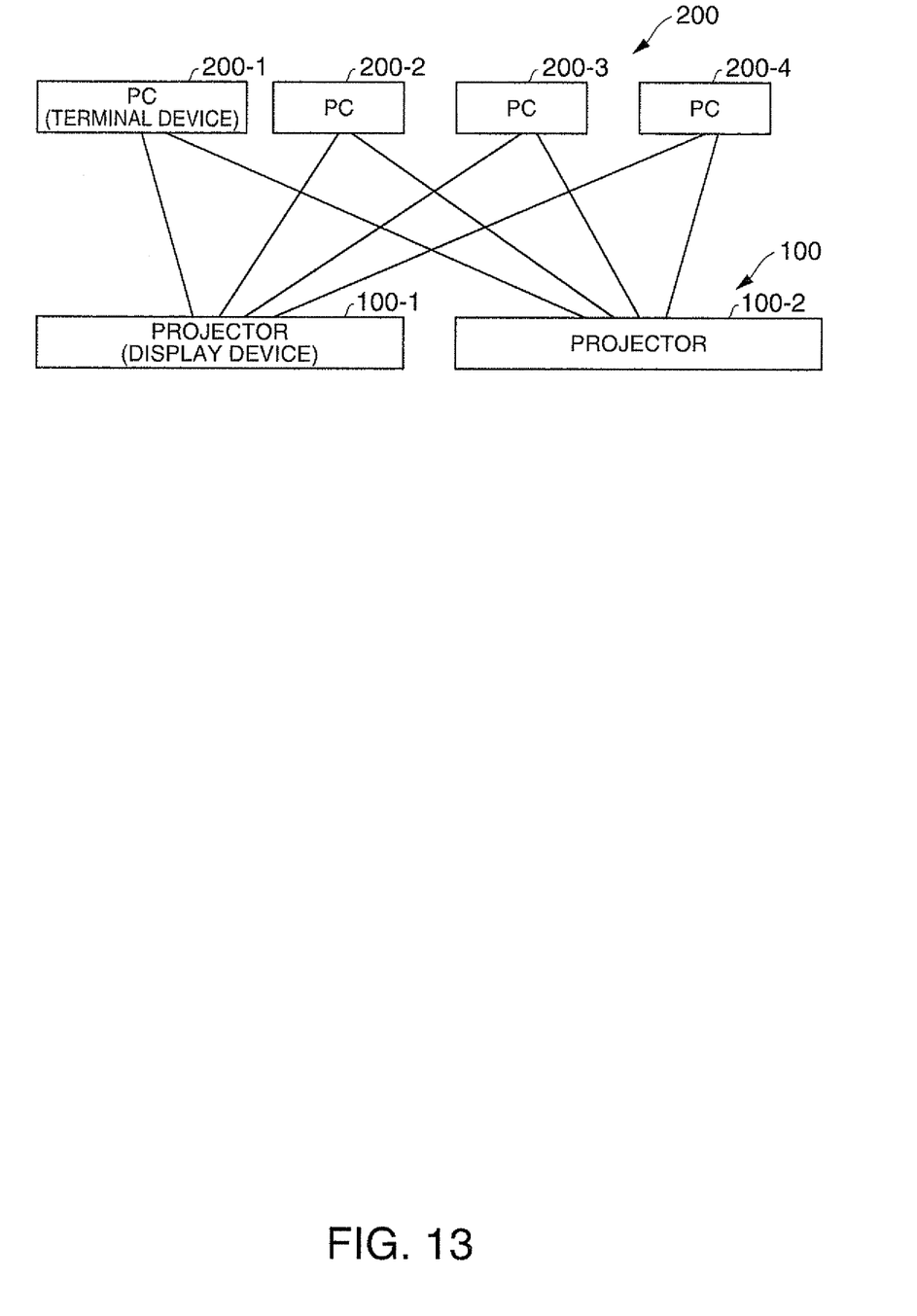
FIG. 13 is a diagram showing an example of a display system according to a second embodiment of the invention.

Although in the first embodiment there is used a single display device, it is also possible to use a plurality of display devices. FIG. 13 is a diagram showing an example of a display system according to a second embodiment of the invention.

The display system according to the present embodiment is configured including a projector 100-1 for independently performing the configuration of the image, a projector 100-2 for dependently performing the configuration of the image, and the four PCs 200-1 through 200-4.

It should be noted that the projector 100-1 and the projector 100-2 do not communicate with each other.

Specifically, the projector 100-1 functions as the projector 100 of the first embodiment, and the projector 100-2 updates the reception number data 142, the image configuration data 144, and so on based on the image configuration information from each of the PCs 200, and projects the presentation image based on the image configuration data 144.

As described above, according also to the present embodiment, the projector 100 has substantially the same functions and advantages as in the first embodiment.

Other Embodiments

It should be noted that applications of the invention are not limited to the embodiments described above, but various modifications thereof are possible. For example, the display device is not limited to the projector 100, but can also be a television set, a liquid crystal monitor, or an electronic device (e.g., a digital camera, cellular phone) having a display function, for example. Further, the terminal device is not limited to the PC 200, but can also be, for example, a cellular phone, a portable information terminal, and so on. Further, the number of terminal devices is not limited to four, but can be three or smaller, or five or larger.

Further, although in the embodiments described above the projector 100 uses the image configuration information including the reception number information, it is also possible to separately use the reception number information and the image configuration information. Further, it is also possible for the display-side communication section 110 to transmit the reception number information only to the PC 200, which is the transmission source of the image configuration alteration request information. Further, it is also possible for the display-side communication section 110 to transmit the image configuration information only to the PC 200, which is the transmission source of the image information.

Further, although in the embodiments described above the reception number is used as the priority, the priority is not limited to the number, but can be a code, characters, and so on. In this case, it is possible for the update section 150 to update the characters or the like to the characters or the like with higher priority.

Further, it is also possible that the projector 100 is provided with authority data representing the authority of alteration to the image configuration by a predetermined management unit such as the PC 200, the user, or a group as apart of the device management data 146, and the display-side information generation section 120 determines whether the image configuration alteration is accepted or rejected using the authority data. Further, the data such as the reception number data 142, the tentative image configuration data 143, and the device management data 146 and the update section 150 are not essential. For example, the update section 150 can update the image configuration data 144 every time the image alteration request is made, and the display-side image generation section 130 can alter the configuration of the individual images to generate the presentation image based on the image configuration alteration request information and the image information.

Further, it is also possible for the computer provided to the projector 100 to retrieve a program stored in an information storage medium to thereby function as the display-side image generation section 120 or the like. As such an information storage medium, CD-ROM, DVD-ROM, ROM, RAM, HDD, and so on can be applied.

Further, the projector 100 is not limited to a liquid crystal projector (a transmissive type or a reflective type such as LCOS), but can be, for example, a projector using a digital micromirror device. Further, the function of the projector 100 can be distributed in two or more devices (e.g., the PC and the projector).

What is claimed is:

1. A display device comprising:
    a display-side communication unit receiving, from at least one terminal device, image configuration alteration request information related to a configuration of a first image and image information of at least one second image, the first image having a portion including the at least one second image;
    a display-side image processing circuit generating the first image based on the image configuration alteration request information and the image information by altering a configuration of only the portion of the first image corresponding to the at least one second image;
    a display-side display device displaying the first image; and
    a display-side processor generating, based on the image configuration alteration request information, transmission start request information of the image information in absence of transmission of the image information;
    the second image displays a plurality of different selection images, each of the selection images corresponding to one of a plurality of different configurations that when selected alter the configuration of the first image, the display-side communication unit transmits the transmission start request information toward the terminal device as a transmission source of the image information, the display-side processor generates priority information that includes a reception number corresponding to a latest configuration of the first image in response to reception of the image configuration alteration request information, and generates completion notification information corresponding to the priority upon completion of reception of the image information corresponding to the priority, and the display-side communication unit transmits the priority information including the reception number toward the terminal device as the transmission source of the image configuration alteration request information, and transmits the completion notification information to the terminal device as the transmission source of the image configuration alteration request information and the terminal device as the transmission source of the image information.

2. The display device according to claim 1, wherein
the display-side processor generates, based on the image configuration alteration request information, transmission stop request information of the image information when stopping transmission of the image information, and the display-side communication unit transmits the transmission stop request information toward the terminal device transmission of the image information from which is to be stopped.

3. The display device according to claim 1, wherein
upon reception of new image configuration alteration request information by the display-side communication unit prior to generation of the first image, the display-side image processing circuit generates the first image based on the new image configuration alteration request information and the image information.

4. The display device according to claim 1, wherein
the display-side processor generates image configuration information related to a configuration of the first image based on the image configuration alteration request information, and the display-side communication unit transmits the image configuration information toward the terminal device as a transmission source of the image information.

5. A terminal device comprising:
a terminal-side image processing circuit generating a configuration altering image used to alter a configuration of a first image displayed by at least one display device, the first image having a portion including at least one second image;

a terminal-side display device displaying the configuration altering image;

a terminal-side processor generating image configuration alteration request information related to a configuration of the first image in response to configuration alteration request operation in a condition in which the configuration altering image is displayed; and a terminal-side communication unit transmitting the image configuration alteration request information toward the display device, the second image displays a plurality of different selection images, each of the selection images corresponding to one of a plurality of different configurations that when selected alter the configuration of the first image, wherein the terminal-side communication unit receives, from the display device, priority information that includes a reception number corresponding to a latest configuration of the first image, completion notification information corresponding to the priority denoting that all image information corresponding to the priority has been received, and image configuration information related to configuration of the first image, if the priority included in the priority information and the priority included in the completion notification information match each other, the terminal-side image processing circuit alters the configuration altering image based on the image configuration information, and if the priority included in the priority information and the priority included in the completion notification information fail to match each other, the terminal-side image processing circuit keeps the configuration altering image.

6. The terminal device according to claim 5, wherein
the terminal-side communication unit receives, from the display device, transmission start request information representing transmission start request of image information in the terminal device, and transmits the image information toward the display device in response to the transmission start request information.

7. The terminal device according to claim 6, wherein
the terminal-side communication unit receives, from the display device, transmission stop request information representing transmission stop request of the image information, and stops to transmit the image information in response to the transmission stop request information.

8. The terminal device according to claim 5, wherein
the terminal-side image processing circuit alters the configuration altering image in accordance with the configuration alteration request operation, and the terminal-side image display unit displays the configuration altering image altered by the terminal-side image processing circuit.

9. A display system comprising:
a display device, the display device comprises:
a display-side communication unit receiving, from at least one terminal device, image configuration alteration request information related to a configuration of a first image and image information of at least one second image, the first image having a portion including the at least one second image;

a display-side image processing circuit generating the first image based on the image configuration alteration request information and the image information; and a display-side display unit displaying the first image; and the terminal device according to claim 5.

10. A display method of an image, comprising:
providing a display device including a display-side display device and a display-side communication unit;

receiving from at least one terminal device by the display-side communication image configuration alteration request information related to a configuration of a first image and image information of at least one second image, the first image having a portion including the at least one second image;

generating the first image based on the image configuration alteration request information and the image information;

displaying the first image by the display-side display device; and generating with a display-side processor, based on the image configuration alteration request information, transmission start request information of the image information in absence of transmission of the image information, the second image displays a plurality of different selection images, each of the selection images corresponding to one of a plurality of different configurations that when selected alter the configuration of the first image, the display-side communication unit transmits the transmission start request information toward the terminal device as a transmission source of the image information, the display-side processor generates priority information that includes a reception number corresponding to a latest configuration of the first image in response to reception of the image configuration alteration request information, and generates completion notification information corresponding to the priority upon completion of reception of the image information corresponding to the priority, and the display-side communication unit transmits the priority information including the reception number toward the terminal device as the transmission source of the image configuration alteration request information, and transmits the completion notification information to the terminal device as the transmission source of the image configuration alteration request information and the terminal device as the transmission source of the image information.

* * * * *